No Printed Specification Available
8061X
B. HINKLEY.
Grain Mill.
Patented Mar. 10, 1834.
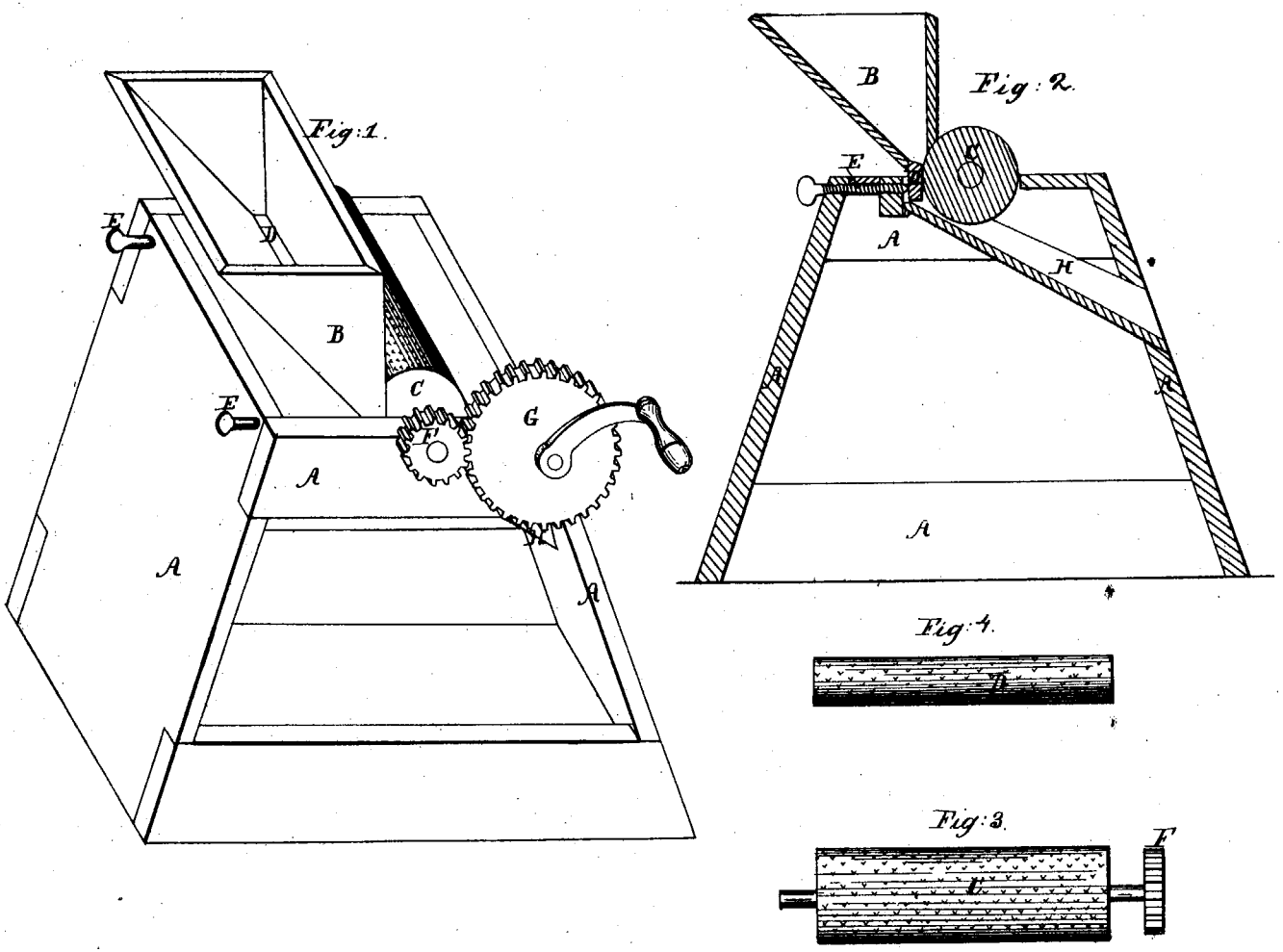
THE NORRIS PETERS CO., PHOTO-LITHO., WASHINGTON, D. C.

Benjamin Hinkley of Fayette Kennebec Co: Maine

Letters Patent.

The Schedule referred to in these Letters Patent and making part of the same contain-
ing a description in the words of the said Benjamin Hinkley himself of his im-
provement in the Mill for cracking or grinding corn and other grain by hand
or other power.

To all to whom these presents shall come:

Be it known that I Benjamin Hinkley of the Town of Fayette in the County of
Kennebec and State of Maine have invented a new and useful improvement
in a mill for cracking or grinding corn or other grain by hand or other power and
that the following is a full and exact description of the construction and operation
of the said machine as invented or improved by me. The size for hand power
is as follows. First. A frame made of plank one and a half inch thick.
The two ends is fifteen inches wide and thirty two inches high. The side pieces of said
frame is at the bottom about thirty six inches long, at at the top about thir-
ty inches long of suitable width to give strength to the frame. Second. A
cylinder made of German or Cast Steel: two and half inches in diameter and
the grinding part about twelve inches long. The surface of which is cut or indented
in form of a rasp or grater. The two ends of said cylinder or shaft are one inch
in diameter and one and a half inch long turned perfectly true. to run in the
boxes and said cylinder or shaft extends at each end about one and half inch
further which last inch and half at each end is turned down to three quar-
ters of an inch in diameter, making the whole cylinder or shaft of solid Steel
about eighteen or nineteen inches long. This cylinder is placed upon or across
the frame running upon cast iron or Composition Boxes. which boxes are placed
upon and half inserted into the top side pieces of the frame. One end of said
cylinder shaft projecting beyond the frame is for a balance or fly wheel. The
other end is for a spur or cog wheel. which spur wheel is about five inches in di-
ameter and one inch thick and made of cast iron. Third. The grinding
part of said Cylinder revolves near a flat surface a plate of wrought iron about
one and quarter inch wide and about a quarter inch thick and same length as
the grinding part of the cylinder. This plate of iron is screwed or bolted to a block
of wood about thirteen inches long three inches wide and one & half inch thick which is placed by the side of the cylinder, the iron surface or plate being nearly perpendic-
ular by the side of this block is placed another block of same dimensions thro' which
passes two screws for the purpose of guaging the flat iron surface to and from the
cylinder. Fourthly parallel with the cylinder and about seven inches from it
is placed an iron shaft about one inch in diameter and about twenty inches
long on one end of which is placed the larger spur or speed wheel of ten inches
diameter and one inch thick this spur wheel runs into and propels the less-
er spur wheel on the end of the cylinder. and on the end of the said iron shaft
is placed the crank or power wheel. The iron shaft also runs upon cast iron
or composition boxes placed upon and half inserted into the top side pieces
of the frame. which shaft and cylinder are confined by cap pieces screwed or
bolted upon the top of said frame. A suitable hopper is placed upon the top of
the frame to pass the corn or grain between the cylinder and flat iron surface and
so in proportion for machines of greater power. I Claim in this machine as
my invention the particular form of the solid steel cylinder. shaft and the
indenture or rasping surface made upon the grinding part of the same and the
flat surface of iron and the manner of screwing and guaging the same to
and from the cylinder shaft.

Exd. M.G:

Witnesses
Geo. Rathbone
Jona. Leech

Benjamin Hinkley

[illegible]

[illegible]